United States Patent
Jones et al.

(10) Patent No.: US 6,981,337 B2
(45) Date of Patent: Jan. 3, 2006

(54) DEVICE FOR ABSORBING WATER VAPOR

(75) Inventors: Stuart Michael Ruan Jones, Herts (GB); David Bedford, Hull (GB)

(73) Assignee: Reckitt Benckiser (UK) Limited, Slough (GB)

( * ) Notice: Subject to any disclaimer, the term of this patent is extended or adjusted under 35 U.S.C. 154(b) by 2 days.

(21) Appl. No.: 10/502,814

(22) PCT Filed: Jan. 29, 2003

(86) PCT No.: PCT/GB03/00363

§ 371 (c)(1),
(2), (4) Date: Nov. 3, 2004

(87) PCT Pub. No.: WO03/064012

PCT Pub. Date: Aug. 7, 2003

(65) Prior Publication Data

US 2005/0044741 A1 Mar. 3, 2005

(30) Foreign Application Priority Data

Jan. 30, 2002 (GB) ............................................. 0202064

(51) Int. Cl.
*B01D 53/26* (2006.01)

(52) U.S. Cl. ............................................. 34/80; 34/93
(58) Field of Classification Search ................... 34/68, 34/80, 93, 210, 230; 105/247; 55/387, 512; 210/282, 483
See application file for complete search history.

(56) References Cited

U.S. PATENT DOCUMENTS

| | | | | |
|---|---|---|---|---|
| 2,249,624 A | * | 7/1941 | Bichowsky | 34/473 |
| 2,446,361 A | * | 8/1948 | Clibbon | 312/31.1 |
| 2,499,328 A | * | 2/1950 | Pawlansky | 34/80 |
| 2,676,078 A | * | 4/1954 | Young | 96/148 |
| 2,994,404 A | | 8/1961 | Schifferly | 183/4.8 |
| 4,098,120 A | * | 7/1978 | Manske | 116/200 |
| 4,453,955 A | | 6/1984 | Cullen et al. | 55/387 |

(Continued)

FOREIGN PATENT DOCUMENTS

EP     0 793 060 A     9/1997

OTHER PUBLICATIONS

Database WPI; Section Ch, Week 199837; Derwent Publications Ltd., London, GB; Class J01, AN 1998–431696; XP002239151 & JP 10 180029 A (DAINIPPON PRINTING CO LTD), Jul. 7, 1998; abstract.
Database WPI; Section Ch, Week 198530; Derwent Publications Ltd., London, GB; Class J01, AN 1985–181429; XP002239152 & JP 60 110319 A (MARUTOMO SHOJI KK), Jun. 15, 1985; abstract.
International Search Report dated Apr. 23, 2003 for Application PCT/GB03/00363.
International Preliminary Examination Report dated Dec. 29, 2003 for Application PCT/GB03/00363.
Combined Search and Examination Report from The Patent Office in Great Britain dated Aug. 29, 2002 for Application GB 0202064.2.

*Primary Examiner*—Stephen Gravini
(74) *Attorney, Agent, or Firm*—Norris McLaughlin & Marcus PA

(57) ABSTRACT

There is provided a container for absorbing water vapour from ambient air, the container having an opening to permit water vapour to enter the container, a perforate shelf positioned above the base of the container and having a water-absorbing agent disposed thereon for absorbing water vapour, and an airway which allows air to flow into the region of the container beneath the shelf, wherein the container comprises an indicator for providing information on the operation of the container, the indicator operating when the liquid in the container has reached a predetermined level.

9 Claims, 2 Drawing Sheets

U.S. PATENT DOCUMENTS

| | | | |
|---|---|---|---|
| 4,546,442 A | 10/1985 | Tinker | 364/500 |
| 4,654,057 A | 3/1987 | Rhodes | 55/208 |
| 4,927,436 A * | 5/1990 | Glienke | 96/119 |
| 4,999,034 A | 3/1991 | Mager et al. | 55/275 |
| 5,148,613 A * | 9/1992 | Cullen | 34/81 |
| 5,766,312 A | 6/1998 | Furhmann et al. | 95/117 |
| 5,785,934 A * | 7/1998 | Jacobs et al. | 422/29 |
| 6,684,648 B2 * | 2/2004 | Faqih | 62/93 |

* cited by examiner

DEVICE FOR ABSORBING WATER VAPOR

The present invention relates to a device for absorbing water vapour. Particularly, although not exclusively, it relates to a container for dehumidifying air in a confined or limited space; and to associated methods.

Humidity, or water vapour in air, is often undesirable as it may interfere with the storage of moisture sensitive materials, such as foodstuffs, cosmetics, pharmaceuticals, household goods and clothes, or it may adversely effect the operation of moisture sensitive equipment. This problem may be particularly pronounced in those areas where humidity levels are particularly high, such as those countries having hot humid climates.

It is therefore often desirable to dehumidify air. Traditional methods for dehumidifying air include the use of mechanical refrigeration equipment and water absorbent materials, such as silica gel.

Typically, methods employing refrigeration equipment involve cooling air to a predetermined temperature below its dew point, so that water condenses from the air and the water may be drained away. Thereafter, the air may be reheated to a predetermined warmer temperature. Techniques including absorbent materials may include continuous operation systems so that water is absorbed by the absorbent in a first cycle and then water desorbed from the absorbent by the application of heat in a second cycle.

Suitably, these techniques suffer from various disadvantages as they typically require bulky and heavy equipment, such as compressors, fans and heaters, which are interconnected by a network of pipes so that water vapour is absorbed continuously from air. Typically, such systems are ill-suited for operation in a confined or limited space. Moreover, the cost associated with such systems may prohibit their use in a domestic environment.

In an attempt to overcome the disadvantages associated with using the aforementioned systems in a confined or limited space, alternative techniques have been developed that include exposing air to an absorbent material. In particular, portable smaller devices comprising a container housing an absorbent material have been employed for dehumidifying air in a limited or confined space, particularly in a domestic environment.

Although absorbents such as silica gel may be employed in these devices, typically silica gel only absorbs up to 30% its weight of water and it is necessary to employ an absorbent having a higher capacity for water vapour absorption to prolong the life and improve the efficiency of the device. Suitably, hygroscopic deliquescent agents, such as calcium chloride, which may absorb 4 to 5 times its weight of water, have been employed in such devices. On absorption of water vapour the deliquescent agent dissolves to form a salt solution.

Although these devices have gone some way to solving the problems associated with absorbing water vapour in a confined space, particularly in a domestic environment, it would be desirable to have more efficient uptake of water vapour.

The present invention seeks to achieve the efficient absorption of water vapour, in particular, absorption of water vapour from air in a confined space, particularly in a domestic environment.

According to a first aspect the present invention provides a container for absorbing water vapour from ambient air, the container having an opening to permit water vapour to enter the container, a perforate shelf positioned above the base of the container and having a water-absorbing agent disposed thereon for absorbing water vapour, and an airway which allows air to flow into the region of the container beneath the shelf, wherein the container comprises an indicator for providing information on the operation of the container, the indicator operating when the liquid in the container has reached a predetermined level.

Preferably, the water-absorbing agent is a deliquescent agent that forms a liquid on absorption of water vapour. Preferred deliquescent agents include calcium chloride and magnesium chloride as these not only exhibit an acceptable water absorption capacity but they are relatively non-caustic which render them suitable for use in devices that may be placed in a domestic environment. This does not exclude other deliquescent salts, for example when intended for use in other environments, for example industrial environments.

One preferred water-absorbing agent is calcium chloride alone. Another is magnesium chloride. Especially preferred is calcium chloride providing up to 20 wt % of the total content and the balance comprising a different water-absorbing agent, preferably magnesium chloride.

Suitably, the water-absorbing agent as defined above may include other components selected from a binder or thickener, for example starch, a pest control agent, a perfume, and odour absorbing agent (for example a zeolite), an antimicrobial agent, and combinations thereof. Preferably, when the water-absorbing agent comprises a deliquescent agent then an antimicrobial agent is included to prevent microbe formation in liquid formed by dissolution of the deliquescent agent.

Preferably the shelf extends substantially between the side wall, or walls, of the container; except for the airway which allows air to flow between the regions above and below the shelf. The airway may conveniently be located at the periphery of the shelf, between the shelf and the wall of the container. Preferably the airway is formed at least in part by a wall portion which is in contact with the water-absorbing agent. When the airway is at the periphery of the sheet the airway is between that wall portion and the wall of the container. When the airway is not at the periphery of the sheet that wall portion entirely defines the airway, and is surrounded, in use, by the water-absorbing agent. Whichever variant is employed the wall portion is preferably also perforate, so that water vapour in the airway can flow from the airway to the water-absorbing agent, through the wall portion; or can flow into the region beneath the shelf.

Suitably there are two airways, preferably arranged opposite to one another.

The openings in the shelf are distinct from the airway(s) mentioned above and are intended to allow water to drip from the water-absorbing agent on the shelf.

The openings may be of any shape and of any size which allows for good passage of liquid, but retention of the water-absorbing material on the shelf. Suitable shapes include circles, squares and slits.

Typically, the openings as defined above have a minimum width of 0.1 mm to 2 mm.

Preferably, the container opening is covered with a semi-permeable membrane to permit water vapour to enter the container and prevent liquid from exiting the container. Suitable semi-permeable membranes are well known to those skilled in the art, such as polytetrafluoroethylene (PTFE) membranes available from W L Gore and Associates Inc., or polyolefin films available under the trade mark TYVEK, or polyurethane films. The semi-permeable membrane not only permits the container of the present invention to function satisfactorily but also prevents spillage of liquid from the container formed by dissolution of the water-absorbing agent, when a deliquescent agent is used.

Preferably, the semi-permeable membrane is immovably secured across the inlet of the container to prevent a user accessing the interior of the container and contacting the water-absorbing agent, thereby improving the safety rating of the container.

Preferably, a semi-permeable membrane used in the present invention is of a type which provides moisture transmission of at least 1000 g, preferably at least 5000 g, and most preferably at least 10000 g water/m² membrane/day.

Suitably, the inlet of the container includes a removable fluid tight seal so that it may be stored without degradation of the water-absorbing agent. Suitably, the fluid tight seal extends across the semi-permeable membrane.

The indicator means suitably provides an indication of the operational status of the container. Suitably, the indicator means is responsive to the absorption of liquid by the water-absorbing agent. Preferably the indicator means indicates the amount of water vapour absorbed by the water-absorbing agent.

The inclusion of an indicator means in the container of the present invention may indicate that the container is functioning satisfactorily and thus maintaining the environment in which the container is placed at an acceptable humidity level. Suitably, the indicator means indicate the end or prospective end of the useful life of the container. Consequently, the humidity level of an environment in which the container is placed may be maintained at a desired level by replacing the container at the end of its life. This may not only negate unnecessary increased expenditure by replacement of the container prior to the end of its useful life but also may avoid an undesirable increase in humidity in a specific area resulting from replacement of the container after expiration of its useful lifetime.

Preferably, the indicator means is separate from the water-absorbing agent.

By the term "separate" we include that the indicator means is an entity separate from the water-absorbing agent. In other words, the water-absorbing agent is not coated or impregnated with the indicator means.

Suitably, an indicator means separate from the water-absorbing agent, particularly an indicator means that is responsive to liquid formed by dissolution of a deliquescent agent, may provide an indication of the amount of liquid produced by the water-absorbing agent. The arrangement is such that the indicator means operates when the liquid has reached a predetermined level. Preferably the indicator means is located in the region of the container above the shelf.

According to one possible embodiment of the present invention, the indicator means provides a continuous indication of the amount of water vapour absorbed by the water-absorbing agent. Suitably, this may provide an indication that the container is functioning satisfactorily, for example by assessing whether the moisture content of the environment in which it is placed is being maintained at an acceptable level.

Alternatively, or additionally, the indicator means may provide an indication that the container has reached the end of its useful life and needs to be replaced and/or the container is about to reach the end of its useful life and will need to be replaced shortly.

Preferably, the indicator means provides a visible and/or audible signal that is indicative of the status of the container.

Typically, it is possible to arrange and/or calibrate the indicator means so that it either provides a continuous indication of the amount of water vapour absorbed by the water-absorbing agent and/or it indicates when the device has come to or, preferably, is about to come to the end of its useful life. Suitably, where the indicator means is responsive to liquid formed by dissolution of the water-absorbing agent upon absorption of water vapour, this may be achieved by measuring the level and location of liquid formed in a particular container following absorption of specific amounts of water vapour by specific quantities of a particular deliquescent agent placed in the container. Consequently, it is possible to arrange the indicator means in the container so that it responds to a specific level or specific levels of liquid in the container corresponding to a specific amount of water vapour absorbed by a known amount of deliquescent agent.

According to a preferred embodiment of the present invention, the indicator means comprises a colorant.

Preferably, the colorant is a dye is miscible with the liquid formed by dissolution of the deliquescent agent so that it provides an instantaneous visible signal of the amount of water vapour absorbed by the water-absorbing agent.

Preferably, the dye is formulated into a formulation that dissolves on contact with liquid formed by dissolution of the deliquescent agent. For example, the dye may be in the form of a capsule, tablet or encased in a liquid soluble pouch or sachet.

Preferably, the dye is arranged within the container so that it mixes with liquid only when a specific amount of the salt solution has dissolved in the container. Suitably, the dye is arranged in the container so that it is contacted by the liquid when the container has reached or is about to reach the end of its useful life.

Preferably, the dye as defined above is attached to an inner wall of the container or placed on a platform in the container. In either case it is preferably held in the region of the container above the shelf, suitably in the upper half of that region. Location of the dye in a central position of the container, for example on a platform supported by the shelf, has the advantage in that false signals due to tilting are less likely.

It will be appreciated from the above that when the indicator means comprises a colorant, then the indicator means generates a visible signal that is representative of the status of the device of the present invention e.g. the container has reached or is about to reach the end of its useful life. Moreover, if the colorant is a dye miscible with the liquid then a near instantaneous signal is provided when the dye mixes with the liquid.

According to a further preferred embodiment of the present invention, the indicator means comprises a plurality of electrodes arranged to be in electrical communication with each other and a signalling device, whereby upon formation of salt solution due to absorption of water vapour by a deliquescent water-absorbing agent an electrical potential is generated which operates the signalling device thereby providing an indication of the amount of water vapour absorbed by the water-absorbing agent.

Suitably, the dissolution of the deliquescent agent as defined hereinbefore produces an electrolyte comprising an aqueous solution of a water-soluble salt, such as an aqueous calcium chloride and/or magnesium chloride solution. Contact of the electrolyte by the plurality of electrodes forms an electrochemical cell and an electrical potential is generated across the electrodes which permits a current to flow through and power the signalling device.

The plurality of electrodes may take any conventional form and be constructed from any conventional material for an electrochemical cell. The electrodes may comprise a pair of rod members having the desired electrical characteristics. Alternatively, one or more of the plurality of electrodes may form the inner surface of the container. As will be appreciated by those skilled in the art, it is necessary for the plurality of electrodes to have distinct and different electronegativities in order to generate an electrical potential to form an electrochemical cell. The electrodes may be constructed, for example, from zinc, copper, carbon or aluminium. The container may also include conventional antidepolarisation and/or anti-plating agents which inhibit depolarisation of the electrochemical cell and/or plating of the plurality of electrodes respectively.

Suitably, the plurality of electrodes may be arranged so that contact between the electrodes and the electrolyte formed by dissolution of the deliquescent agent occurs only after a specific amount of the deliquescent agent has dissolved e.g. contact occurs at or near the end of the useful life of the device of the present invention.

The signalling device which is in electrical communication with the plurality of electrodes may generate an audible signal, such as an alarm. Alternatively or additionally, the signalling device may comprise a visual signalling means, such as a light, an array of lights, or an LED display. An array of different coloured lights or an LED display is particularly preferred for providing a continuous indication of the amount of water vapour absorbed by the water-absorbing agent with time. For example, a series of green, amber and red coloured lights may be employed: the green light being lit to indicate the device is operating satisfactorily and it does not need replacing; the amber light being lit to indicate the device is operating satisfactorily but it is approaching the end of its useful life and will need replacing with a new one shortly; and the red light being lit to indicate the device has reached the end of its useful life and needs replacing immediately with a new one.

It will be appreciated that a battery-aided indicator means may be provided; the electrochemical potential alone may not be sufficient in some embodiments to power the circuitry or signalling devices which are employed.

Preferably, the container further includes an outlet having a resealable fluid tight seal to permit drainage of liquid from the container and/or to permit water-absorbing agent to be added to the container. Conveniently, this enables the container of the present invention to be reused thereby decreasing the amount of expenditure required when it is necessary to replace an exhausted device with a new one.

Suitably, the container of the present invention is dimensioned so that it may be used in a confined space, particularly a confined space in a domestic environment, such as a drawer, chest, wardrobe, cupboard, packing case, refrigerator, freezer, cool box, caravan, car, car boot or boat. Suitably, the container of the present invention is 5 to 30 cm high, 10 to 50 cm long, and 5 to 30 cm wide. Typically, the device includes 50–1000 g of water-absorbing agent, preferably 100–500 g.

Suitably, the container is rigid or flexible. Most preferably, the container is rigid.

Preferably, the container, including the shelf and airway(s), are formed from a plastics material, for example a polyolefin, by techniques well known to those skilled in the art such as injection moulding, blow moulding and vacuum forming.

According to a further aspect, the present invention provides a method for removing water vapour from air, comprising providing a container as described hereinbefore and placing the container in a humid atmosphere. Preferably, the container is placed in a confined space.

The present invention will now be illustrated by way of the following non-limiting examples, in which:

FIG. 1 shows a rigid plastics container (2) of translucent HDPE material. In FIG. 1 solid lines denote features of unobstructed view and dotted lines denote features visible hazily through the translucent HDPE.

Figure 1:
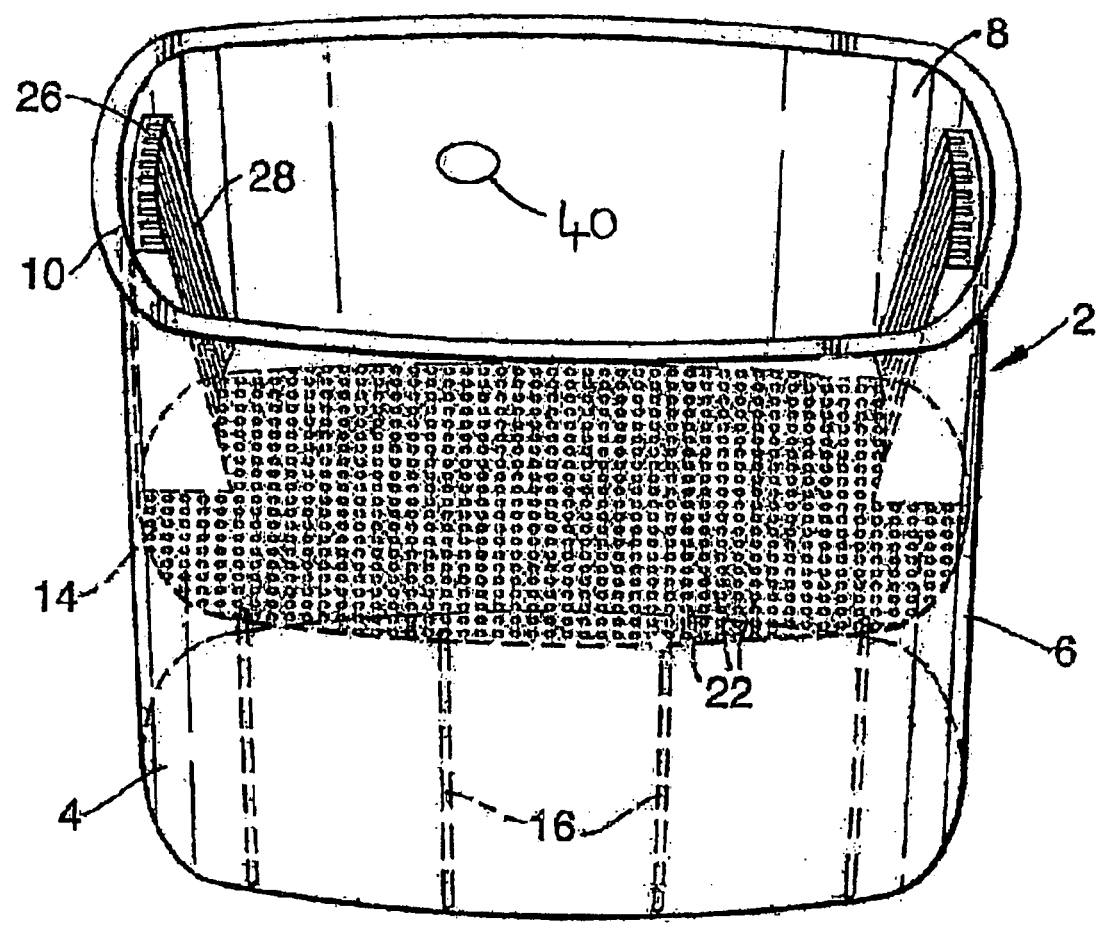
FIG. 1 is a perspective view of a container of the present invention, employing a dye as an indicator.

The container (2) of FIG. 1 is formed by injection moulding, and has a lozenge-shaped or parallel-sided oval-shaped base (4) and a side wall (6) extending upwardly from base (4) to define an opening (8) at its upper end. The upper end of side wall (6) terminates in an annular rim (10) that extends around the opening (8). A semi-permeable membrane (not shown) comprised of TYVEK material (Trade Mark; HDPE material, from Du Pont) is heat sealed to rim (10) so that it extends across and covers the opening (8). The interior of the container (2) includes a planar shelf of translucent HDPE (14) supported by supports (16), being upright ribs moulded on the internal surface of the side wall. A plurality of circular holes (22) of diameter 1 mm pass through the shelf (14). The shelf supports a calcium chloride water-absorbing agent (not shown). The wall (6) of container (2) includes at opposite ends airways or vents (26). Each airway extends upwardly from the shelf, to near the top of the container, and has a surface (28) spaced from the wall. There is a space between the surface (28) and the wall. The surfaces (28) of the airways are co-moulded with the shelf. Each surface (28) is perforate, having an array of parallel slits extending from the top to the bottom of the surface. When the water-absorbing agent is on the shelf air may reach the region of the container beneath the shelf, and thence the under-surface of the body of water-absorbing agent. To do this air entering the container through opening (8) can pass through the slits, whose top regions are not covered by the body of water-absorbing agent. The air is then in the airway and can flow downwards. Where it passes the shelf it is not impeded; the airway is unoccluded throughout its length.

In this embodiment the surface (28) of each airway has a somewhat crescent-shaped cross-section, to follow the shape of the container wall.

The operation of the container shown in FIG. 1 is simple. After purchase the user removes an impermeable plastics cover (not shown). This is provided during manufacture in order to maintain the water-absorbing material in a substantially desiccated condition, prior to the commencement of use. The opening remains covered by the membrane. The user places the container on a level surface in an air space in which reduction of humidity is desired. Whenever water vapour can come into contact with the body of water-absorbing agent there is the prospect that water molecules will be absorbed. Water molecules can be absorbed at the exposed upper surface of the body of water-absorbing material, at its under-surface, and through the airways. The latter two possibilities arise because air can flow through the airways into the region of the container beneath the shelf. The openings (22) in the shelf allow the salt solution to collect in the bottom of the container.

The container of FIG. 1 includes a dye as an indicator. The dye may be, for example, one of the SANDOLAN (Trade Mark) dyes available from Clariant, Leeds, UK or any food coloring dye, and it retained in a small water soluble sachet (40), (for example employing a PVOH-, starch-, sugar-, or gelatin-based material), having the appearance of a bead or button. The sachet is adhered to the side wall (6) of container (2) at a predetermined position in the region of the container above the shelf, corresponding to the level of liquid formed when the container is exhausted, and should be replaced.

Thus, during use the level of aqueous calcium chloride solution rises within the container (2) as more deliquescent agent absorbs water vapour and dissolves. Presently the aqueous calcium chloride solution in the container (2) reaches the same level as the water soluble sachet (40). The aqueous calcium chloride solution dissolves the sachet (40) and the dye contained therein dissolves in the calcium chloride solution, thereby providing an instantaneous visual indication that device has reached, or almost reached, the end of its useful life.

Figure 2:
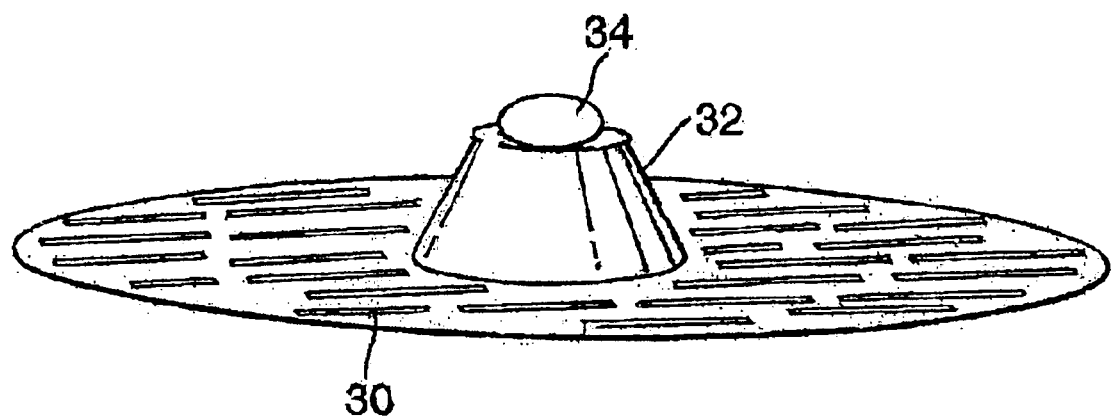
FIG. 2 is a perspective view of a shelf of an alternative container of the present invention.

FIG. 2 is a perspective view of an alternative shelf. The main differences are that it is elliptical; instead of circular openings it has slits (30), of width 1 mm; it is not co-moulded with surfaces (28) of the airways—the airways (not shown) are wholly moulded as one with the container wall; and in its central region it has a substantially frusto-conical upward projection (32), which carries on its upper surface a small bead (34) of a water-miscible dye, retained within a water-soluble skin. The bead is above the upper surface of the water-absorbing agent (not shown). An advantage over the arrangement of FIG. 2 over that of FIG. 1 is that it is less prone to giving an erroneous signal as a result of the container having been placed on a tilted surface.

Figure 3:
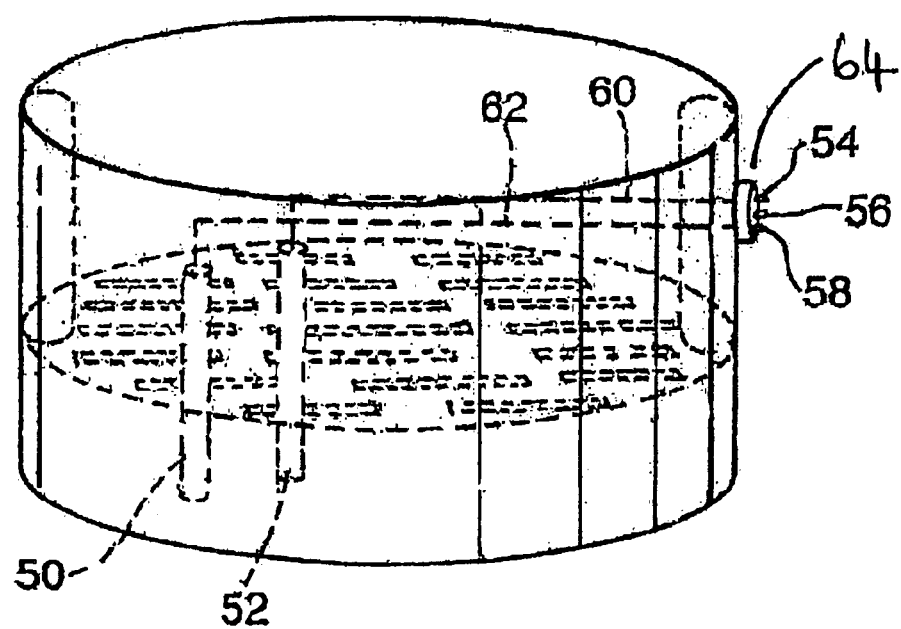
FIG. 3 is a perspective view of an alternative container of the present invention including an electrochemical cell as an indicator.

FIG. 3 shows an alternative embodiment of the device as illustrated in FIG. 2 and corresponding features are indicated with identical reference numerals. In the device of FIG. 5, zinc (50) and a copper (52) electrode rods extend from a predetermined level, corresponding to the level of liquid formed when the amount of water vapour absorbed by the container is at its maximum value, through shelf (14) and to the base (4) of the container (2). The electrodes (50,52) are spaced apart from each other and are connected in electrical communication with red, amber and green LEDs (54,56,58) by electrically conducting leads (60,62) and a small switching circuit (64). LEDs (54,56,58) independently produce green, amber and red light, respectively, when they are lit.

In use water passes through the semi-permeable membrane (12) and contacts the deliquescent agent which upon absorption of water vapour forms an electrolyte comprising an aqueous calcium chloride solution. The aqueous calcium chloride solution drains from the deliquescent agent, via the openings (22) in the shelf (14) and to a small degree the airways (26) into the base (4) of the container (2) where it contacts the two electrodes (50,52). An electric potential is generated by the two electrodes and an electric current flows between the electrodes (50,52) via conducting leads (60,62) and light (54) which produces a green light indicating the device is operating satisfactorily and it does not need replacing. The resistance of the electrical circuit comprising the two electrodes (50,52), lights (54,56,58) and electrical conducting leads (60,62) is such that the ionic concentration of the calcium chloride electrolyte increases with further dissolution of the deliquescent agent. When the ionic strength of the electrolyte has reached a value indicative of the fact that the container is at the end of its useful life, the amber light (56) is illuminated and green light turned off. When the strength of the electrolyte reaches a peak value indicating that the amount of water vapour absorbed by the device is at its maximum value, the red light is illuminated and the amber light turned off, thereby indicating that the container has reached the end of its useful life and needs replacing.

In an alternative embodiment the determination is not achieved by ionic strength of the electrolyte, but simply by the circuitry "recognising" the immersion in electrolyte of electrodes in succession; notionally, of a "green electrode", then an "amber electrode" and finally a "red electrode".

What is claimed is:

1. A container for absorbing water vapour from ambient air, the container having an opening to permit water vapour to enter the container, a perforate shelf positioned above the base of the container and having a water-absorbing agent disposed thereon for absorbing water vapour, and an airway which allows air to flow into the region of the container beneath the shelf, wherein the container comprises an indicator for providing information on the operation of the container, the indicator operating when the liquid in the container has reached a predetermined level.

2. A container as claimed in claim 1 wherein the water-absorbing agent is a deliquescent agent.

3. A container according to claim 1, wherein the opening of the container is covered by a semi-permeable membrane.

4. A container according to claim 1 wherein the water-absorbing agent comprises calcium chloride.

5. A container according to claim 1 wherein the indicator is a dye.

6. A container according to claim 1 wherein the indicator employs an electrical circuit which includes as an electrolyte a salt solution resulting from the absorption of water vapour by the water-absorbing agent.

7. A container according to claim 1 wherein the indicator is adapted to provide a signal when a salt solution resulting from the absorption of water vapour by the water-absorbing agent has reached a predetermined level.

8. A method of dehumidifying an air space, comprising the step of placement in the air space of a container according to claim 1.

9. A method for absorbing water vapour comprising the step of providing a container according to claim 1 and permitting it to come into contact with water vapour.

* * * * *